US012588607B2

(12) United States Patent
Mandel et al.

(10) Patent No.: US 12,588,607 B2
(45) Date of Patent: Mar. 31, 2026

(54) ELECTRIC BLOWER APPARATUS WITH BATTERY PACK

(71) Applicant: Andreas Stihl AG & Co. KG, Waiblingen (DE)

(72) Inventors: Roland Mandel, Stuttgart (DE); Sebastian Piekarek, Stuttgart (DE); Markus Koenig, Leinfelden-Echterdingen (DE); Andrea Hein, Ehningen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 485 days.

(21) Appl. No.: 18/068,939

(22) Filed: Dec. 20, 2022

(65) Prior Publication Data

US 2023/0189726 A1     Jun. 22, 2023

(30) Foreign Application Priority Data

Dec. 21, 2021     (EP) ..................................... 21216632

(51) Int. Cl.
A01G 20/47          (2018.01)

(52) U.S. Cl.
CPC ................................... A01G 20/47 (2018.02)

(58) Field of Classification Search
CPC ..... A01G 20/47; F04D 29/66; F04D 25/0673; F04D 25/08; E01H 1/0809
See application file for complete search history.

(56) References Cited

U.S. PATENT DOCUMENTS

| | | | | |
|---|---|---|---|---|
| 4,223,419 | A | * | 9/1980 | Sato ....................... E01H 1/0809 |
| | | | | 15/327.5 |
| 5,233,946 | A | * | 8/1993 | Yamami .................... F01P 5/06 |
| | | | | 123/41.63 |
| 6,109,865 | A | * | 8/2000 | Ishikawa ................. F04D 17/12 |
| | | | | 415/58.1 |
| 6,283,726 | B1 | * | 9/2001 | Fackelmann ....... F04D 29/5806 |
| | | | | 415/58.4 |
| 6,305,048 | B1 | * | 10/2001 | Salisian ................ A47L 9/2873 |
| | | | | 15/327.5 |
| 2001/0005482 | A1 | * | 6/2001 | Wolpert .................... B08B 5/02 |
| | | | | 417/234 |
| 2002/0060107 | A1 | * | 5/2002 | Kamoshita ............ F04D 29/664 |
| | | | | 181/224 |

(Continued)

FOREIGN PATENT DOCUMENTS

| | | | |
|---|---|---|---|
| CN | 205423213 U | | 8/2016 |
| CN | 211692946 U | * | 10/2020 |

(Continued)

*Primary Examiner* — Marc Carlson
(74) *Attorney, Agent, or Firm* — Walter Ottesen, P.A.

(57) ABSTRACT

The disclosure relates to an electric blower apparatus having a back plate, for carrying on the back of a user. The back plate has a plate axis, oriented in the vertical direction, an upper plate section and a lower plate section. The blower spiral of the blower apparatus comprises an axial end face, to which an electric motor is fixed having a drive shaft which is connected to a fan wheel. For the supply of energy, a battery pack is provided, which is arranged in a receiving space between the first, upper plate section of the back plate and the blower spiral. The housing shaft comprises an insertion opening which faces away from the electric motor.

17 Claims, 7 Drawing Sheets

(56)             References Cited

U.S. PATENT DOCUMENTS

| 2002/0159881 | A1* | 10/2002 | Marshall | F04D 29/281 |
| | | | | 415/102 |
| 2006/0059654 | A1* | 3/2006 | Kremsler | A47L 5/14 |
| | | | | 15/405 |
| 2006/0162116 | A1* | 7/2006 | Andresen | E01H 1/0809 |
| | | | | 15/327.5 |
| 2008/0134997 | A1* | 6/2008 | Ito | F01P 5/06 |
| | | | | 123/41.65 |
| 2015/0377253 | A1* | 12/2015 | Shibata | F04D 25/082 |
| | | | | 415/119 |
| 2016/0108924 | A1* | 4/2016 | Conrad | F04D 25/0673 |
| | | | | 417/423.7 |
| 2016/0198636 | A1* | 7/2016 | Poole | A01G 20/47 |
| | | | | 15/327.5 |
| 2019/0029191 | A1* | 1/2019 | Poole | A01G 20/47 |
| 2020/0236875 | A1 | 7/2020 | Poole et al. | |
| 2020/0390041 | A1* | 12/2020 | Koide | F04D 17/16 |
| 2021/0148372 | A1* | 5/2021 | Naka | F04D 27/004 |
| 2022/0178097 | A1* | 6/2022 | Remy | A01G 20/47 |

FOREIGN PATENT DOCUMENTS

| DE | 199 59 557 | B4 | 6/2001 | | |
| DE | 602 12 495 | T2 | 6/2007 | | |
| DE | 10 2015 008 189 | A1 | 12/2015 | | |
| DE | 202020002177 | U1 * | 9/2020 | | A01G 20/47 |
| DE | 10 2020 006 641 | A1 | 5/2021 | | |
| EP | 3330545 | A1 * | 6/2018 | | F04D 25/0606 |
| EP | 4 066 627 | A1 | 10/2022 | | |
| FR | 2 831 928 | A1 | 5/2003 | | |
| JP | 2002-21794 | A | 1/2002 | | |
| JP | 2002021794 | A * | 1/2002 | | A47L 5/22 |
| WO | WO-03038281 | A1 * | 5/2003 | | F04D 25/082 |
| WO | 2020/161421 | A1 | 8/2020 | | |

* cited by examiner

ELECTRIC BLOWER APPARATUS WITH BATTERY PACK

CROSS-REFERENCE TO RELATED APPLICATIONS

This application claims priority of European patent application no. 21 216 632.6, filed Dec. 21, 2021, the entire content of which is incorporated herein by reference.

TECHNICAL FIELD

The disclosure relates to an electric blower apparatus having a back plate, for carrying on the back of a user. The back plate has a plate axis, oriented in the vertical direction, and includes at least a first, upper plate section and a second, lower plate section which are arranged one after the other in the vertical direction of the plate axis. The blower spiral includes an air blower outlet and, on an axial end face thereof which faces the back plate, carries an electric motor, the drive shaft of which is connected to a fan wheel which rotates in the blower spiral. At least one battery pack is provided as an energy source. The battery pack required for the operation of the electric blower apparatus is carried on the back plate, together with the blower apparatus.

BACKGROUND

In order to achieve an adequate service time, the provision of a plurality of battery packs is known. As the weight of battery packs is not inconsiderable, the load to be carried on the back of the user is increased accordingly. If a battery pack is discharged, and the removal thereof is required for charging, or for the replacement thereof with a charged battery pack, good accessibility to the battery pack is desirable. As the battery pack moreover includes electrical contacts for the transmission of electrical energy, it should also be ensured that, insofar as possible, the battery pack is not arranged in a dirt accumulation area of the blower apparatus. Additionally, weight distribution of the load which is to be carried via the back plate, and thus the site of arrangement of a battery pack, are also of significance.

SUMMARY

It is an object of the disclosure to provide an electric blower apparatus such that, with appropriate weight distribution, a battery pack required for the purposes of operation is arranged such that, firstly, good accessibility is provided for the replacement of batteries and, secondly, the battery pack is arranged in a spatial area which is exposed to the least possible contamination.

This object is, for example, achieved via an electric blower apparatus having an electric blower apparatus including: a back plate for carrying on the back of a user; the back plate defining a plate axis oriented in a vertical direction of the back plate; the back plate, in the vertical direction of the plate axis, including at least one first, upper plate section and at least one second, lower plate section; the at least one first, upper plate section and the second, lower plate section being arranged one after the other in the vertical direction of the plate axis; a blower spiral having an air blower outlet; the blower spiral having a first axial end face facing the back plate; an electric motor arranged on the first axial end face of the blower spiral; a fan wheel configured to rotate in the blower spiral; the electric motor having a drive shaft connected to the fan wheel; at least one battery pack for operating the electric motor; the electric blower apparatus defining a receiving space for the at least one battery pack between the first, upper plate section of the back plate and the blower spiral; a housing shaft for the at least one battery pack, the housing shaft being held in the receiving space; and, the housing shaft having an insertion opening facing away from the electric motor.

Between the first upper plate section of the back plate and the blower spiral, according to the disclosure, a receiving space is configured for the battery pack. In this receiving space, a housing shaft for the battery pack is secured. The housing shaft includes an insertion opening for a battery pack, which is averted from the electric motor. The insertion opening faces the upper end of the back plate, and is thus upward-facing, as a result of which the risk of contamination is limited. By the arrangement of the battery pack above the electric motor, in the region of the upper plate section of the back plate, a high center of gravity is achieved, which significantly enhances the wearing comfort of the backpack blower apparatus. Moreover, by the position of the insertion opening, good accessibility to the insertion opening is provided, for the insertion or removal of the battery pack.

In a further embodiment of the disclosure, the housing shaft includes a vertical axis which is oriented through the insertion opening. The structural arrangement of the housing shaft in the receiving space is selected such that the vertical axis is arranged with an overall or spatial inclination angle to the plate axis. As a result, accessibility to the insertion opening for the replacement of the battery pack is further improved.

A spatial inclination angle is to be understood as an angle which is both laterally inclined to the plate axis and/or can also be inclined in other spatial directions to the plate axis.

The spatial or general inclination angle to the vertical axis of the housing shaft can be configured such that, in an overhead view of the back plate, the vertical axis is laterally inclined to the plate axis at a first inclination angle. By the lateral inclination of the plate axis, easier accessibility to the insertion opening of the housing shaft is achieved.

The spatial or general inclination angle can also be configured such that the vertical axis of the housing shaft is inclined to the plane of the back plate at a second inclination angle, particularly with a backward inclination. The term "backward inclination" describes an inclination angle whereby the housing shaft, in the region of its insertion opening, assumes a greater clearance to the back plate than in the region of its base. Accordingly, the insertion direction of the battery pack in the housing shaft is oriented obliquely downwards, thereby improving accessibility.

In a particular configuration, the general or overall inclination angle can be formed by a combination of the first lateral inclination angle to the plate axis and the second inclination angle which is formed to the plane of the back plate. This produces a combined spatial inclination angle, via which an oblique lateral insertion direction to the back plate is achieved for a battery pack in the housing shaft.

The first lateral inclination angle and/or the second inclination angle formed to the plane of the back plate appropriately lie between 2° and 15°. An angular range between 5° and 10° is advantageous. In a particular configuration, an inclination angle of 10° is preferred.

High-capacity battery packs, in addition to having a high weight, occupy a large space. It can therefore advantageously be provided that the blower spiral is inclined to the back plate at a housing angle. The housing angle of the blower spiral is selected such that the blower spiral assumes a clearance to the first upper plate section of the back plate which is greater than the clearance of the blower spiral to the second lower plate section of the back plate. The housing shaft is arranged in the spatial area having the greater clearance of the blower spiral to the back plate. As a result of this oblique arrangement, the housing shaft can be sunk in the spatial area between the back plate and the blower spiral. Advantageously, the insertion opening of the housing shaft can thus be arranged on an approximately equal plane to the upper edge of the blower spiral.

The insertion opening and the vertical axis of the housing shaft define the insertion direction of the battery pack. The housing shaft is arranged such that the insertion direction is essentially oriented in a vertical direction of the back plate.

It can be advantageous if the housing shaft itself is configured as a mechanical component for the retention of the blower spiral on the back plate. In a first embodiment, the housing shaft can be directly fixed to the back plate and/or fixed to the blower spiral. In a particular configuration, it is provided that the housing shaft is fixed to the back plate via an antivibration element. In a further embodiment of the disclosure, the housing shaft can also be fixed to the blower spiral via an antivibration element. The housing shaft thus forms a connective structural component between the back plate and the blower spiral. The structural component thus formed is isolated from vibrations via the antivibration elements.

In addition to the fastening of the blower spiral to the back plate via the housing shaft, it can be provided that the blower spiral is fixed directly to the back plate via an antivibration element. All the antivibration elements which support the blower apparatus and/or the housing shaft can advantageously be arranged horizontally. The antivibration elements can be arranged perpendicularly and/or approximately perpendicularly to the plane of the back plate. In a further embodiment of the connection of the blower spiral to the back plate, it can be advantageous if the foot of the blower spiral, alternatively or additionally, is braced on a base plate which, in combination with the back plate, forms an L-shaped carrier for the blower apparatus.

BRIEF DESCRIPTION OF DRAWINGS

The invention will now be described with reference to the drawings wherein.

DETAILED DESCRIPTION

Figure 1:
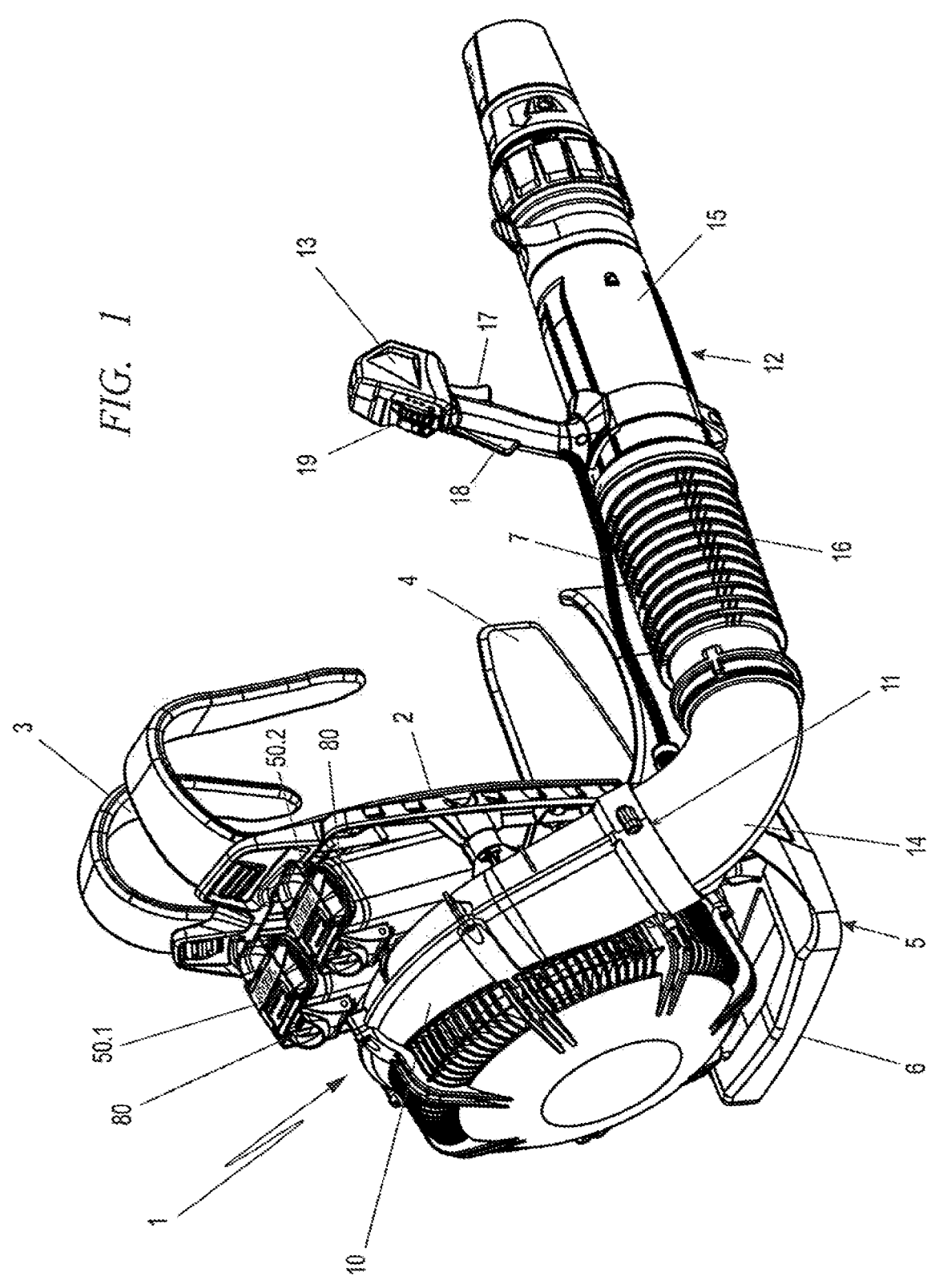
FIG. 1 shows an electric blower apparatus having a battery assembly according to the disclosure, in a perspective view from the rear.

The embodiment of an electric blower apparatus 1 represented in FIG. 1 is a backpack blower apparatus. Other configurations of a blower apparatus, such as a hand-held blower apparatus, a ride-on blower apparatus or similar can also be equipped with the subject matter of the disclosure.

The backpack blower apparatus 1 includes a back plate 2, which is fixed to the back of user via schematically represented shoulder straps 3 and a schematically represented hip belt 4. The back plate 2 is part of a carrier 5, which is provided with a base plate 6. The back plate 2 and the base plate 6 form the carrier 5 which, in a side view, is configured with an L-shape.

The back plate 2 carries a blower spiral 10, which includes an outlet 11 for the connection of a blower tube 12. A handle for the 13 for the holding and the direction of the blower tube 12 is fixed to the blower tube 12. The blower tube 12 includes a rigid rear tube section 14 for connection to the outlet 11 of the blower spiral 10. The tube section 14 is appropriately rotatably mounted in the outlet 11. A flexible tube section 16 is connected to the rear tube section 14, and is joined to a rigid front tube section 15. The handle 13 is fixed to the front tube section 15. The front tube section 15 is pivotable in all spatial directions, relative to the rear tube section 14.

Figure 2:
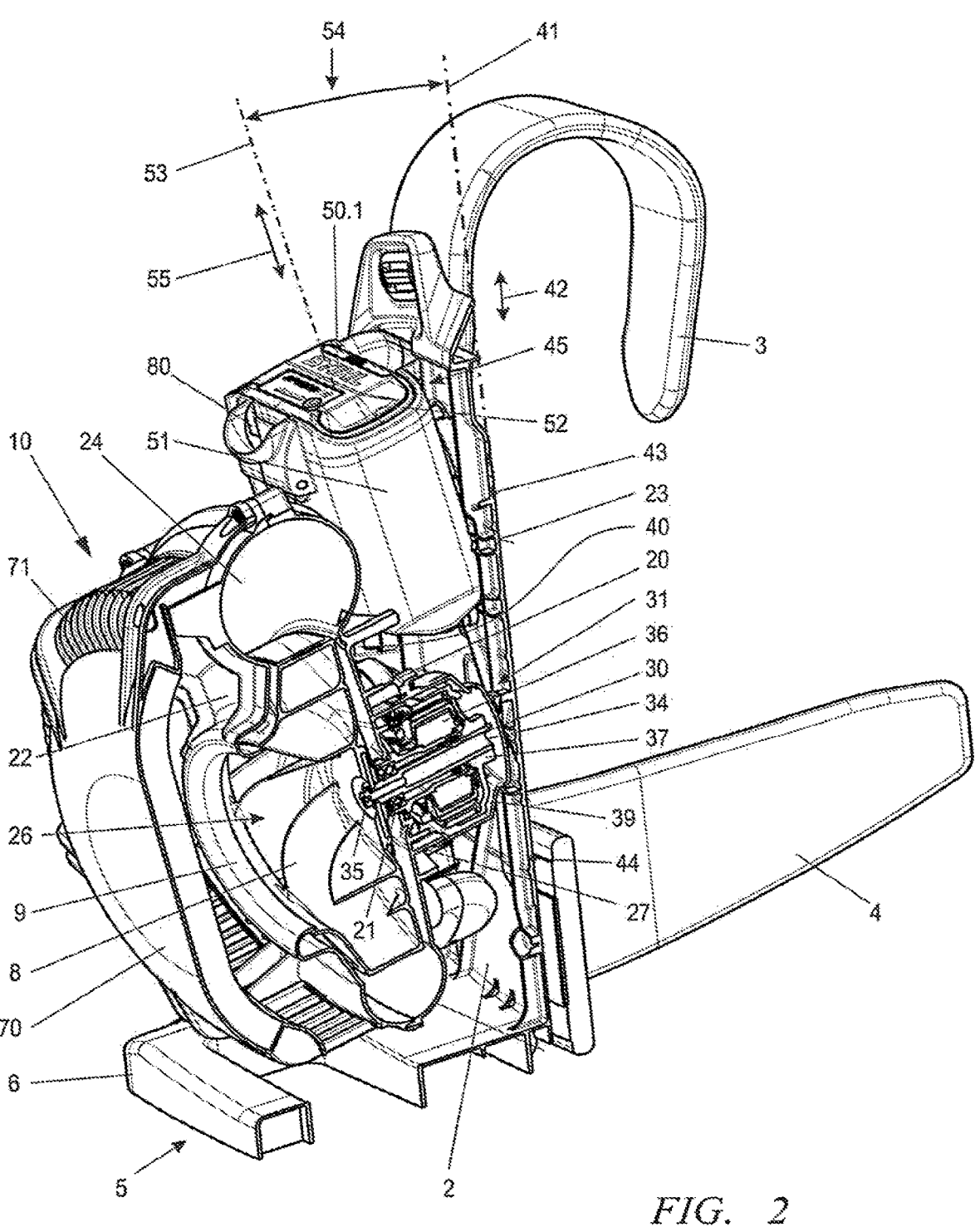
FIG. 2 shows a sectional view of the blower apparatus according to FIG. 1, in a perspective representation.
Figure 4:
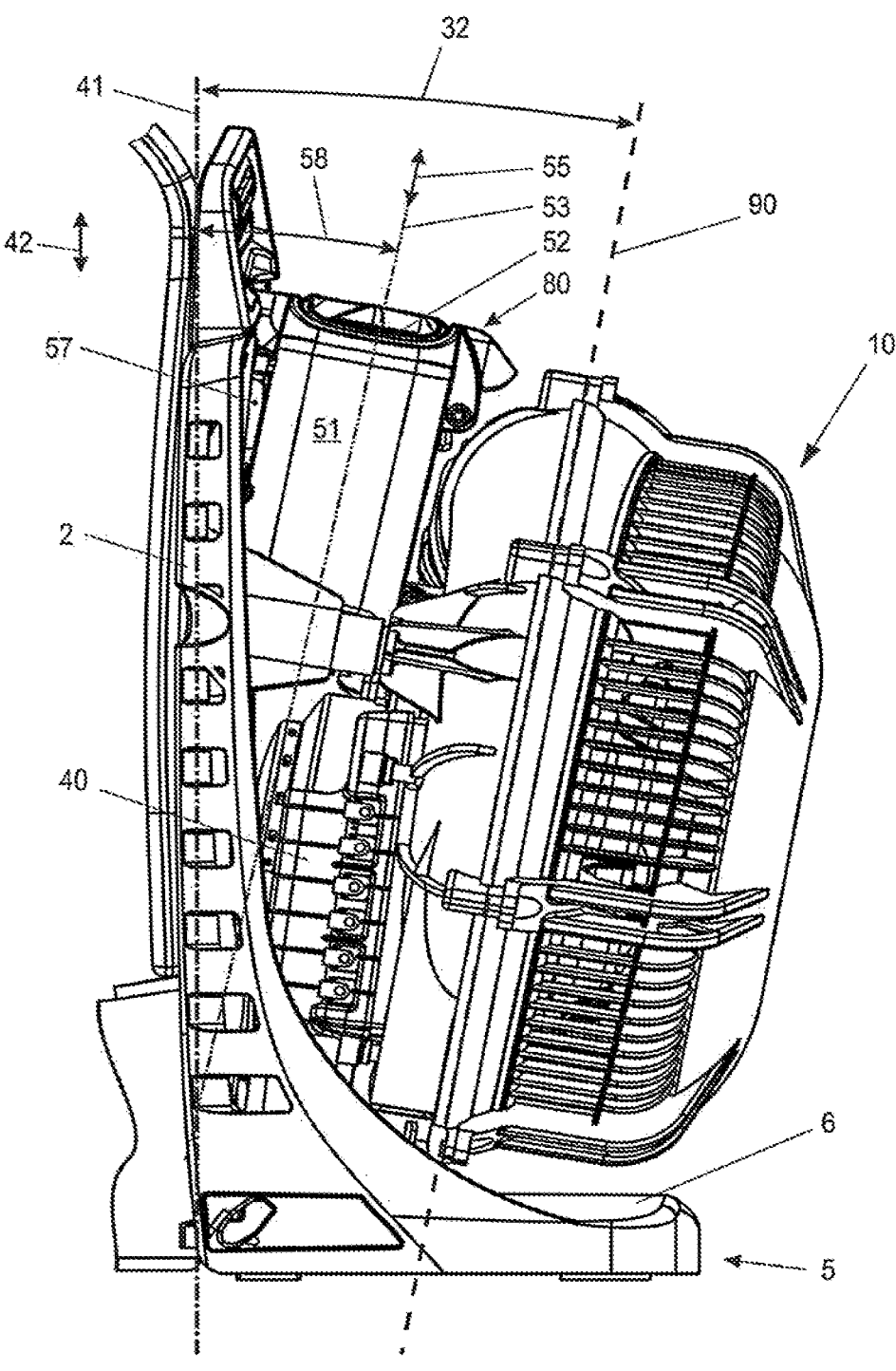
FIG. 4 shows a side view of the electric blower apparatus according to FIG. 1.

In the handle 13, operator-controlled elements are provided, for example a throttle lever 17, a throttle lever lock 18 or further operator-controlled elements 19. The operator-controlled elements are connected via a connecting line 7 to control electronics 40 for controlling an electric motor 30 (FIGS. 2, 4). The energy required for operating the electric motor 30 is supplied by at least one battery pack 50.1, 50.2. The at least one battery pack 50.1, 50.2 is held in a receiving space 45 between the blower spiral 10 and the back plate 2. In the embodiment represented, two battery packs 50.1 and 50.2 are provided in the receiving space 45, which are appropriately arranged next to one another.

As shown in FIG. 2, the blower spiral 10 includes a spiral duct 24, which terminates at the outlet 11. In the center 26 of the spiral duct 24, the fan wheel 8 rotates, wherein the center 26 is delimited by a first axial end face 20 and a second axial end face 22. The fan wheel 8 is arranged between the axial end faces 20, 22. The first axial end face 20 is arranged opposite the back plate 2, with a clearance, thus forming a structural space 31 which, in particular, is employed for the accommodation of a drive, such as an electric motor 30.

Figure 5:
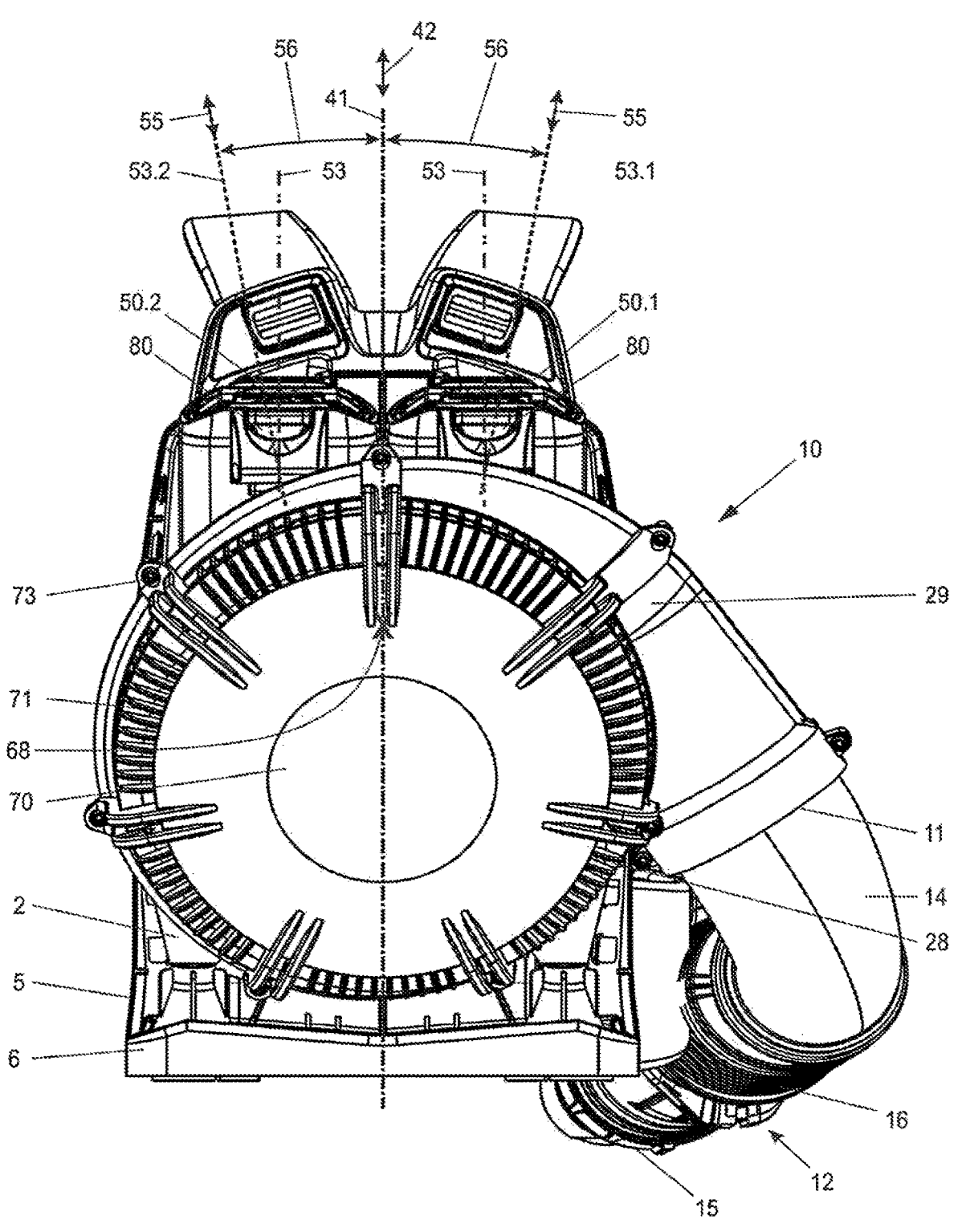
FIG. 5 shows a view of the electric blower apparatus according to FIG. 1, from the rear.

The second axial end face 22 is arranged on the side of the blower spiral 10 which is averted from the back plate 2. In the second axial end face 22, an intake opening 9 is configured, via which ambient air is axially admitted to the fan wheel 8 and is radially conveyed in the spiral duct 24. The spiral duct 24 extends from a first end 28 to a second end 29 (FIG. 5). The second end 29 forms the outlet 11 of the spiral duct 24.

In front of the intake opening 9, a cover 70 is provided, which assumes the form of a plate, a disk or similar. The cover 70, in combination with the blower spiral 10, delimits an annular intake gap, which is covered by a protective grille 71. The cover 70, in combination with the protective grille 71, forms a structural unit which is retained on the blower spiral 10 via fastenings 73. Appropriately, a sound attenuation mat 75 is fixed to the inner side of the cover. The sound attenuation mat 75, in combination with the cover 70, contributes to a significant reduction in operating noise.

In the embodiment represented, the fan wheel 8 is driven by the electric motor 30 which, in the structural space 31, is advantageously retained at the first axial end face 20 of the blower spiral 10. The drive shaft 34 of the electric motor 30 projects through a shaft opening 21 in the first axial end face 20 of the blower spiral 10 into the center 26 of the blower spiral 10. The inwardly-projecting end section 35 of the drive shaft 34 is attached to the fan wheel 8 in a torsionally rigid manner.

The electric motor 30 is advantageously an "external-rotor motor", that is, the stator 36 is arranged inside the rotor 37. The drive shaft 34 which is connected to the rotor 37 projects through the stator 36. The drive shaft 34 is mounted in a central bush of a bearing flange of the electric motor 30, and can preferably be axially secured. Other forms of construction of an electric motor are also employable in the context of the disclosure.

The electric motor 30 can be accommodated in a motor housing 39, which is fixed to an annular housing holder 27 of the axial end face 20, particularly by a plugged arrangement. The plug-in connection between the motor housing 39 and the housing holder 27 can include a form-fitted housing security element. The motor housing 39 itself is advantageously open at its end face, and is particularly closed by the axial end face 20 of the blower spiral 10.

The back plate 2 for carrying the blower apparatus 1 on the back of a user includes a plate axis 41 which is oriented in a vertical direction 42 of the back plate 2. The plate axis 41, in particular, is a central axis of the back plate 2. The back plate 2 itself includes a first, upper plate section 43 and at least one second, lower plate section 44. In the embodiment represented, the shoulder straps 3 are fixed to the first, upper plate section 43. The hip belt 4 is fixed to the second, lower plate section 44. In the vertical direction 42 of the back plate 2, further plate sections can be provided, which are appropriately arranged between the upper plate section 43 and the lower plate section 44. The first, upper plate section 43 and the second, lower plate section 44 are arranged one after the other in the vertical direction 42 of the plate axis 41. In the embodiment, the plate sections 43 and 44 engage directly with one another.

According to the disclosure, the arrangement of the blower spiral 10 on the back plate 2 is configured such that a receiving space 45 is formed between the first, upper plate section 43 and the blower spiral 10. The receiving space 45 is dimensioned such that at least one battery pack 50.1, 50.2 can be accommodated in the receiving space 45. According to the disclosure, it is provided that at least one housing shaft 51 for a battery pack 50.1 or 50.2 is arranged in the receiving space 45. In the event that—as represented in the embodiment—two battery packs 50.1 and 50.2 are provided, a housing shaft 51 is assigned to each battery pack 50.1 and 50.2. Each battery pack 50.1 and 50.2 thus arranged is held in a dedicated housing shaft 51.

The arrangement of battery packs 50.1 and 50.2 in the receiving space 45 between the first, upper plate section 43 and the blower spiral 10 results in a high center of gravity 68, which significantly enhances the wearing comfort of the blower apparatus 1. The center of gravity 68, in the vertical direction 42 of the plate axis 41, advantageously lies between the electric motor 30 and the battery packs 50.1 and 50.2. The center of gravity 68 is represented, in an exemplary manner, in FIGS. 3, 5 and 7.

Figure 6:
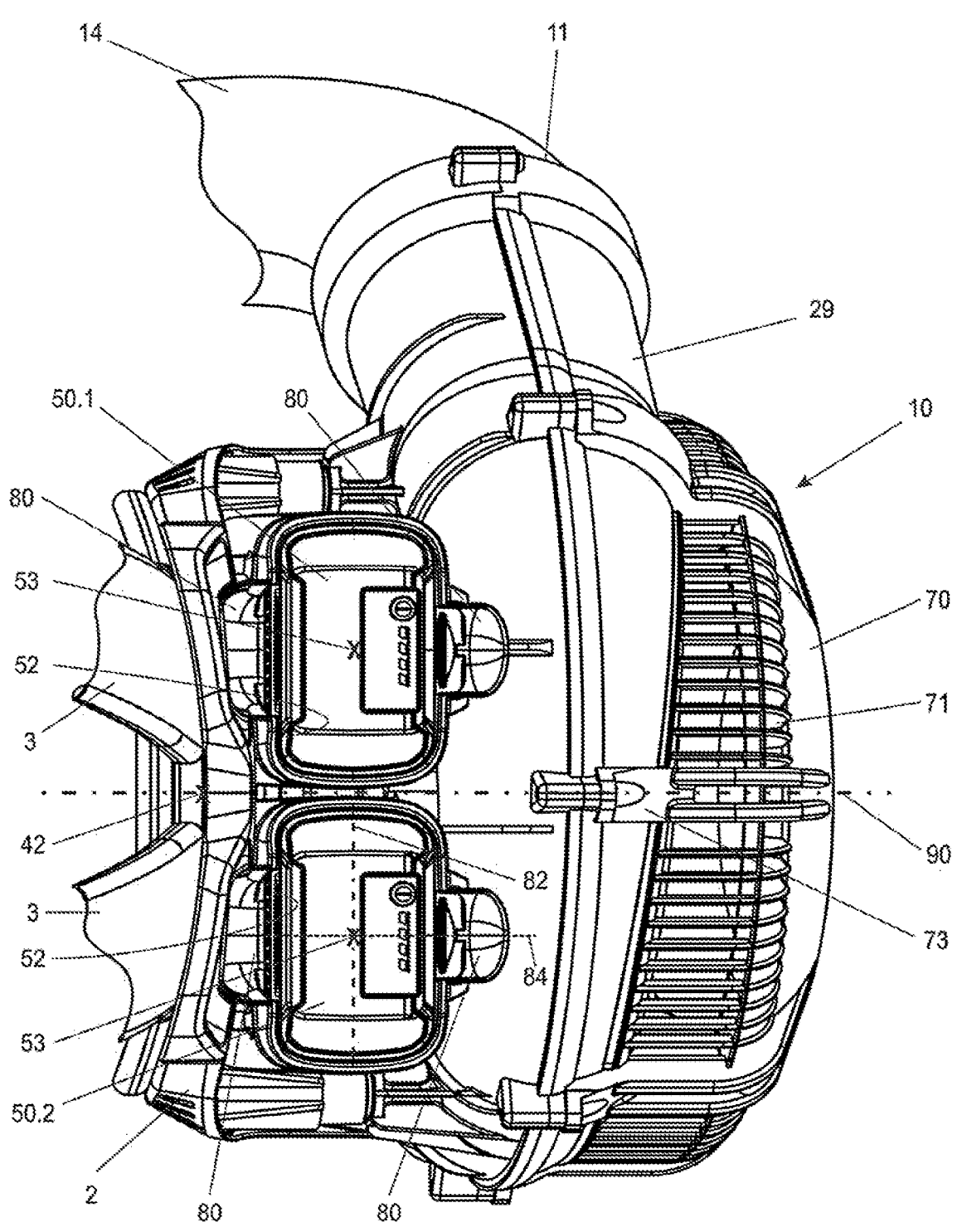
FIG. 6 shows a view of the blower apparatus according to FIG. 1, from above; and, FIG. 7 shows a schematic representation of a blower apparatus according to FIG. 1, with fastening elements in the form of schematically represented antivibration elements.

The housing shaft 51 includes an insertion opening 52 for a battery pack 50.1 or 50.2. The insertion opening 52 is configured to match the cross-sectional shape of the battery pack 50.1, 50.2. In the embodiment represented, the insertion opening 52 assumes a rectangular basic shape, as represented in the overhead view according to FIG. 6. The arrangement is configured such that a long main axis 82 of the insertion opening 52, which extends over the width of the insertion opening 52, is arranged in parallel, or essentially in parallel with the plane 23 of the back plate 2. The transverse axis 84 of the insertion opening 52, which extends transversely to the width of the insertion opening 52, is perpendicular, or essentially perpendicular to the plane 23 of the back plate 2. The height H of the housing shaft 51 is greater than the width of the insertion opening 52 and, in particular, is a multiple of times greater than the width of the insertion opening 52.

On the broad sides of the insertion opening 52, grip molds 80 are configured on the housing shaft 51, via which a user can grip an inserted battery pack 50.1, 50.2. The battery pack 50.1, 50.2 can thus be fully accommodated, or substantially fully accommodated in the housing shaft over its entire height. An operating member is appropriately arranged in a grip mold 80, for the locking of the battery pack in the housing shaft 51.

The insertion opening 52 is averted from the electric motor 30. The insertion opening 52 is arranged at a distance from the intake opening 9 of the blower spiral 10, and thus lies outside the contamination zone. The insertion opening 52, in particular, is easily accessible from above. The housing shaft 51 includes a vertical axis 53 which is oriented through the insertion opening. A battery pack 50.1 or 50.2 is inserted in the insertion direction 55 through the insertion opening 52 into the housing shaft 51. In order to facilitate the insertion of the battery pack 50.1 or 50.2 in the insertion direction 55 into the housing shaft 51, it can be advantageous if the housing shaft 51 is arranged with an inclination in relation to the back plate 2. In the embodiment represented according to FIG. 2, the vertical axis 53 of the housing shaft 51 is inclined in relation to the back plate 2 at an overall or general inclination angle 54.

The overall inclination angle 54 can be a spatial inclination angle. According to the disclosure, it is provided that the overall inclination angle can be differently configured. In a first representational view of the back plate 2, according to FIG. 5, the vertical axis 53 can be oriented in parallel with the plate axis 41. It can be appropriate that the vertical axis 53, in an overhead view of the back plate 2, is arranged such that the vertical axis 53.1, represented by a broken line, is laterally inclined in relation to the plate axis 41 at a first inclination angle 56. If two battery packs 50.1 and 50.2 are arranged in the receiving space 45, a configuration can be established such that a vertical axis 53.1 of one housing shaft 51 is inclined to the right, in relation to the plate axis 41, at a first inclination angle 56, and the other vertical axis 53.1 of the other housing shaft 51 is inclined to the left, in relation to the plate axis 41, at a first inclination angle 56. This results in a slightly laterally-oriented insertion direction 55 for a battery pack 50.1 or 50.2 in each case.

As represented in the embodiment, two battery packs 50.1 and 50.2 are provided for the operation of the electric blower apparatus 1, which are respectively arranged on an upper side of the plate axis 41. In the view from the rear according to FIG. 5, one battery pack 50.1 is arranged on one side of the centrally-oriented plate axis 41, and the battery pack 50.2 is arranged on the other side of the centrally-oriented plate axis 41. As can further be seen from the overhead view according to FIG. 6, the arrangement of the battery packs 50.1 and 50.2 is advantageously configured such that the battery packs 50.1 and 50.2 are arranged symmetrically to the plate axis 41. The common center of gravity of both battery packs 50.1 and 50.2 thus lies on the central plane 90 of the blower apparatus 1. The plate axis 41 lies on the central plane 90 of the blower apparatus 1.

Figure 3:
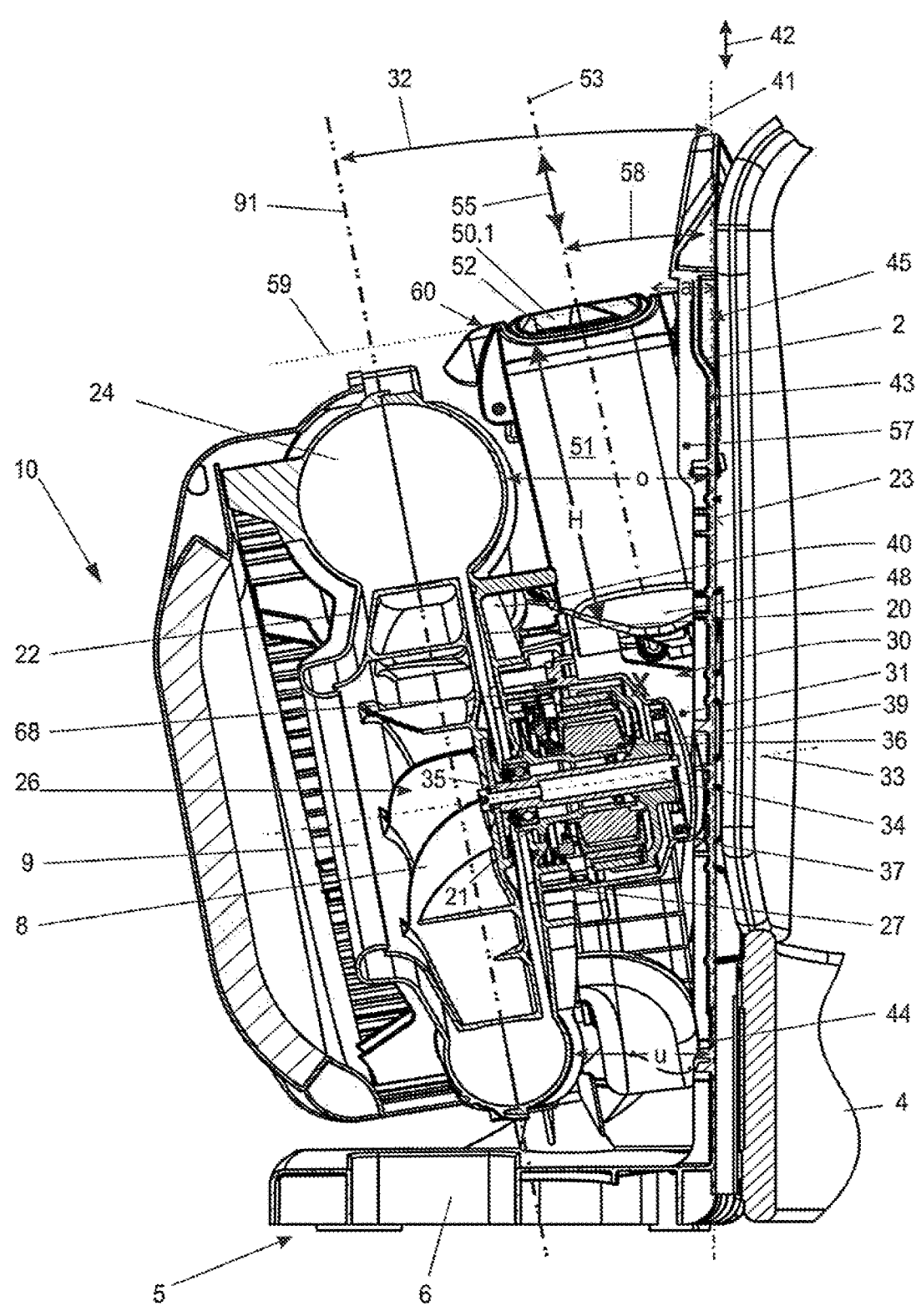
FIG. 3 shows a further sectional view of the electric blower apparatus according to FIG. 1.

As represented in FIG. 3, the arrangement of the housing shaft 51 can also be provided such that the vertical axis 53, in the side view according to FIG. 3, is inclined at a second inclination angle 58. In other words, the back plate 2 forms a plane 23, wherein the vertical axis 53 of the housing shaft 51 is inclined in relation to the plane 23 of the back plate 2 at a second inclination angle 58, and is particularly inclined to the rear. Via the inclination angle 56, it is achieved that the insertion opening 52 is arranged with a greater clearance a to the back plate 2 than the base of the housing shaft 51. Via this greater clearance a, a good accessibility to the insertion opening 52 for the insertion of a battery pack in the insertion direction 55 is provided.

The housing shaft 51 can be configured such that the vertical axis 53 of the housing shaft 51 is arranged, firstly at a first lateral inclination angle 56 to the plate axis 41, or secondly at a second inclination angle 58 to the plane 23 of the back plate 2. In an embodiment, the arrangement is configured such that the general or overall inclination angle 54 of the vertical axis 53 is composed of a first lateral inclination angle 56 and a second inclination angle 58 formed with the plane 23 of the back plate 2.

The magnitude of the overall, the first and/or the second inclination angle 54, 56 or 58 advantageously lies in the range of 2° to 15°. In a particular configuration, the inclination angle 54, 56 or 58 is formed in the range of 5° to 10°. An arrangement with an inclination angle 54, 56 and/or 58 of 10° is appropriate.

In a further embodiment of the disclosure, it is provided that the blower spiral 10 is inclined in relation to the back plate 2, or in relation to the plane 23 of the back plate 2, at a housing angle 32. As can be seen from the sectional representation according to FIG. 3, the drive shaft 34 of the electric motor 30 has a rotational axis 33 which is inclined, in the event of the inclination of the blower spiral 10 in relation to the plane 23 of the back plate 2. The housing angle 32 is formed between a central dividing plane 91 of the blower spiral 10 and the plane 23 of the back plate 2 or—as shown in the representation according to FIG. 3—the plate axis 41.

Figure 7:
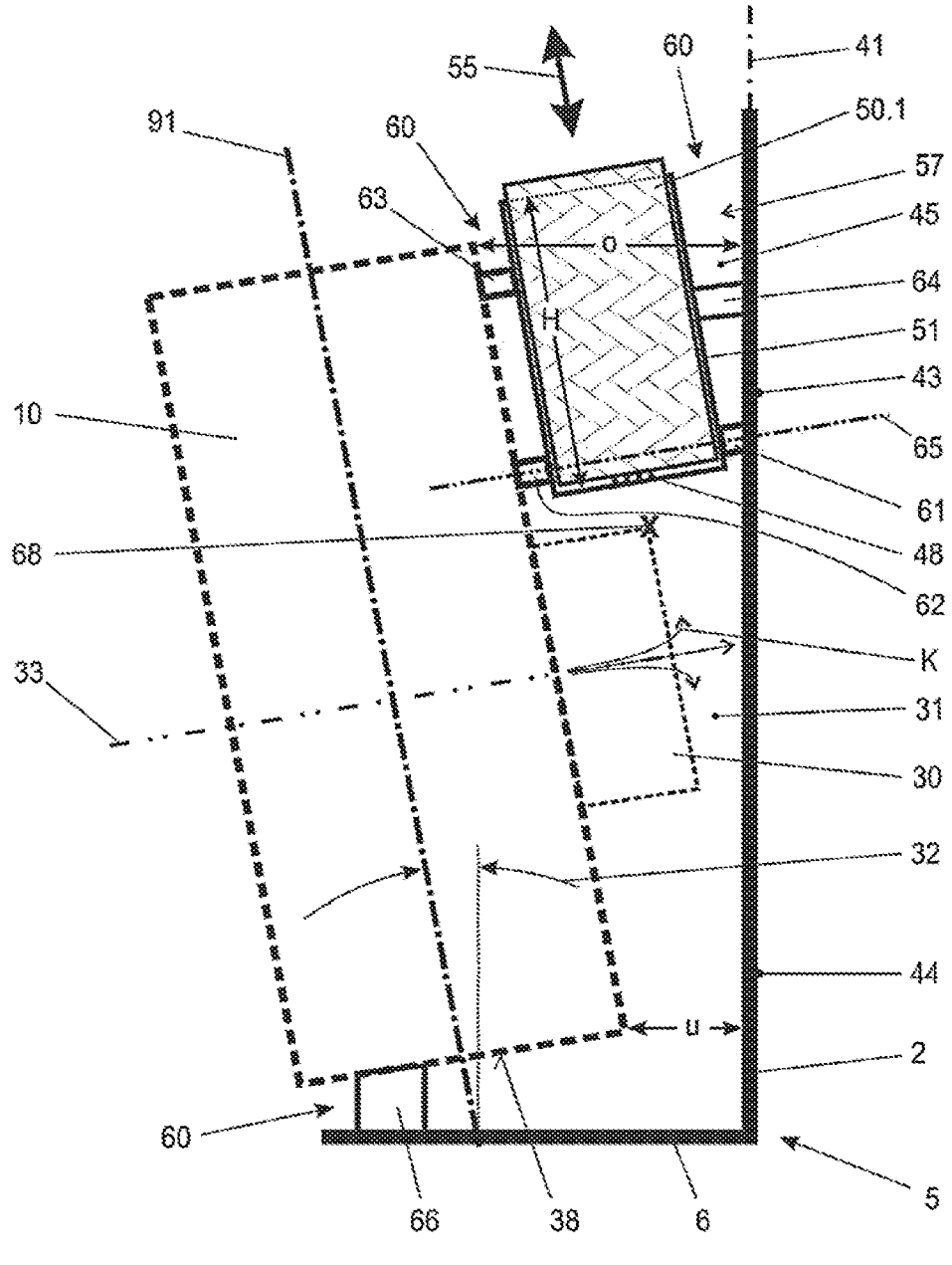

From the inclination of the blower spiral 10 at the housing angle 32, it proceeds that—as also represented in FIGS. 3 and 7—the blower spiral 10 assumes a first clearance o to the first, upper plate section 43. The blower spiral 10 assumes a clearance u to the second, lower plate section 44. Via the housing angle 32, the arrangement is configured such that the upper clearance o to the upper plate section 43 is greater than the lower clearance u to the lower plate section 44. By the inclination of the blower spiral 10 in relation to the plane of the back plate 2, a larger spatial area 57 for one or more battery packs is formed between the blower spiral 10 and the upper plate section 43.

The housing shaft 51 for the accommodation of a battery pack 50.1, 50.2 is arranged in the spatial area 57 formed by the inclination of the blower spiral 10. As a result of the inclination of the blower 10, and the larger spatial area 57 thus formed, the housing shaft 51 can penetrate between the blower spiral 10 and the back plate 2 to the extent that the insertion opening 52 lies on an approximately equal plane 59 to the upper edge of the blower spiral 10.

As is further shown in the sectional representations according to FIGS. 2 and 3, the base 48 of the housing shaft 51 is arranged adjacently to the electric motor 30. The base 48 of the housing shaft 51 forms a delimitation of the structural space 31 in which the electric motor 30 is arranged. The electric motor 30 is cooled by a cooling air stream K from the blower spiral 10. The cooling air stream K enters the motor housing 39, and is expelled into the structural space 31 in the region of the back plate 2. The housing shaft 51 delimits the structural space 31 and is contacted by the expelled cooling air stream K from the electric motor 30. This arrangement can be employed for the temperature control of a battery pack 50.1, 50.2 which is accommodated in the housing shaft 51. Via the cooling air stream K which is expelled from the motor housing 39, a battery pack 50.1, 50.2 can be cooled, or can also be warmed.

The housing shaft 51 can be mechanically fastened to the back plate 2. Alternatively, the housing shaft 51 can also be mechanically fastened to the blower spiral 10. In a particular configuration, the housing shaft 51 is mechanically connected, firstly to the back plate 2 and secondly to the blower spiral 10 via fastening elements 60, such that the housing shaft 51 itself functions as a structural fastening component between the back plate 2 and the blower spiral 10.

In a particular configuration, the mechanical connection between the housing shaft 51 and the back plate 2 and/or the mechanical connection between the housing shaft 51 and the blower spiral 10 can be formed via fastening elements 60. In a particular configuration, a fastening element can be configured in the form of an antivibration element. As indicated in the schematic representation according to FIG. 7, antivibration elements 61 and 62 can be provided which are arranged, on one side, between the housing shaft 51 and the back plate 2 and, on the other side, between the blower spiral 10 and the housing shaft 51. In an advantageous configuration, the antivibration elements 61 and 62 are arranged on a common axis 65.

In another appropriate configuration, the antivibration elements 63 and 64 which are arranged, on one side, between the blower spiral 10 and the housing shaft 51 and, on the other side, between the housing shaft 51 and the back plate 2, can be arranged at different heights.

For the support of the overall load of the blower apparatus 1 on the L-shaped carrier 5, a supporting element can appropriately be provided between the foot 38 of the blower spiral 10 and the base plate 6 of the carrier 5. The supporting element is advantageously an antivibration element 66.

It is understood that the foregoing description is that of the preferred embodiments of the invention and that various changes and modifications may be made thereto without departing from the spirit and scope of the invention as defined in the appended claims.

The invention claimed is:

1. An electric blower apparatus comprising:
    a back plate for carrying on a back of a user;
    said back plate defining a plate axis oriented in a vertical direction of said back plate;
    said back plate, in the vertical direction of the plate axis, including at least one first, upper plate section and at least one second, lower plate section;
    said at least one first, upper plate section and said second, lower plate section being arranged one after the other in the vertical direction of the plate axis;
    a blower spiral having an air blower outlet;
    said blower spiral having a first axial end face facing said back plate;
    an electric motor arranged on said first axial end face of said blower spiral;
    a fan wheel configured to rotate in said blower spiral;
    said electric motor having a drive shaft connected to said fan wheel;
    at least one battery pack for operating said electric motor;
    the electric blower apparatus defining a receiving space for said at least one battery pack between said first, upper plate section of said back plate and said blower spiral;

a housing shaft for said at least one battery pack, said housing shaft being held in said receiving space;

said housing shaft having an insertion opening facing away from said electric motor;

wherein said housing shaft defines a vertical axis oriented through said insertion opening; and, said vertical axis is arranged with a spatial inclination angle to said plate axis;

wherein said insertion opening and said vertical axis of said housing shaft determine an insertion direction for said at least one battery pack; and, wherein, in a view from a rear of said back plate, said insertion direction is laterally inclined to said plate axis at a first inclination angle.

2. The electric blower apparatus of claim 1, wherein said back plate defines a plane; and, said vertical axis of said housing shaft is inclined to said plane of said back plate at a second inclination angle.

3. The electric blower apparatus of claim 2, wherein at least one of said first inclination angle and said second inclination angle lies in a range of 2° to 15°.

4. The electric blower apparatus of claim 2, wherein at least one of said first inclination angle and said second inclination angle lies in a range of 5° to 10°.

5. The electric blower apparatus of claim 2, wherein at least one of said first inclination angle and said second inclination angle is 10°.

6. The electric blower apparatus of claim 1, wherein said blower spiral is inclined to said back plate at a housing angle such that said blower spiral assumes a first clearance to said first, upper plate section of said back plate which is greater than a second clearance of said blower spiral to said second, lower plate section of said back plate.

7. The electric blower apparatus of claim 6, wherein said housing shaft is arranged in a spatial area having said first clearance of said blower spiral to said back plate.

8. The electric blower apparatus of claim 1, wherein said insertion opening and said housing shaft define an insertion direction of said battery pack; and, said insertion direction is oriented in the vertical direction of the back plate.

9. The electric blower apparatus of claim 1, wherein said housing shaft is fixed to said back plate.

10. The electric blower apparatus of claim 1, wherein said housing shaft is fixed to said blower spiral.

11. The electric blower apparatus of claim 1 further comprising an antivibration element; and, said housing shaft being fixed to said blower spiral via said antivibration element.

12. The electric blower apparatus of claim 1 further comprising an antivibration element; and, said blower spiral being fixed to said back plate via said antivibration element.

13. The electric blower apparatus of claim 1, wherein said first inclination angle lies in a range from 2° to 15°.

14. The electric blower apparatus of claim 1, wherein said housing shaft is one of two housing shafts; said two housing shafts include a first housing shaft defining a first insertion direction and a second housing shaft defining a second insertion direction; said first insertion direction being, in a view from a rear of said back plate, inclined right by an inclination angle and said second insertion direction being, in the view from the rear of said back plate, inclined left by a further inclination angle.

15. The electric blower apparatus of claim 1, wherein said first inclination angle lies in a range from 2° to 15°.

16. An electric blower apparatus comprising:

a back plate for carrying on a back of a user;

said back plate defining a plate axis oriented in a vertical direction of said back plate;

said back plate, in the vertical direction of the plate axis, including at least one first, upper plate section and at least one second, lower plate section;

said at least one first, upper plate section and said second, lower plate section being arranged one after the other in the vertical direction of the plate axis;

a blower spiral having an air blower outlet;

said blower spiral having a first axial end face facing said back plate;

an electric motor arranged on said first axial end face of said blower spiral;

a fan wheel configured to rotate in said blower spiral;

said electric motor having a drive shaft connected to said fan wheel;

at least one battery pack for operating said electric motor;

the electric blower apparatus defining a receiving space for said at least one battery pack between said first, upper plate section of said back plate and said blower spiral;

a housing shaft for said at least one battery pack, said housing shaft being held in said receiving space;

said housing shaft having an insertion opening facing away from said electric motor;

wherein said housing shaft defines a vertical axis oriented through said insertion opening; and, said vertical axis is arranged with a spatial inclination angle to said plate axis;

wherein said insertion opening and said vertical axis of said housing shaft determine an insertion direction for said at least one battery pack;

wherein said back plate defines a plane;

said insertion direction being inclined to said plane of said back plate at a first inclination angle;

an antivibration element; and, said housing shaft being fixed to said back plate via said antivibration element.

17. An electric blower apparatus comprising:

a back plate for carrying on a back of a user;

said back plate defining a plate axis oriented in a vertical direction of said back plate;

said back plate, in the vertical direction of the plate axis, including at least one first, upper plate section and at least one second, lower plate section;

said at least one first, upper plate section and said second, lower plate section being arranged one after the other in the vertical direction of the plate axis;

a blower spiral having an air blower outlet;

said blower spiral having a first axial end face facing said back plate;

an electric motor arranged on said first axial end face of said blower spiral;

a fan wheel configured to rotate in said blower spiral;

said electric motor having a drive shaft connected to said fan wheel;

at least one battery pack for operating said electric motor;

the electric blower apparatus defining a receiving space for said at least one battery pack between said first, upper plate section of said back plate and said blower spiral;

a housing shaft for said at least one battery pack, said housing shaft being held in said receiving space;

said housing shaft having an insertion opening facing away from said electric motor;

a plurality of antivibration elements;

said housing shaft being fixed to said back plate via at least a first of said plurality of antivibration elements; and, said housing shaft being fixed to said blower spiral via at least a second of said plurality of antivibration elements.

* * * * *